Patented July 10, 1934

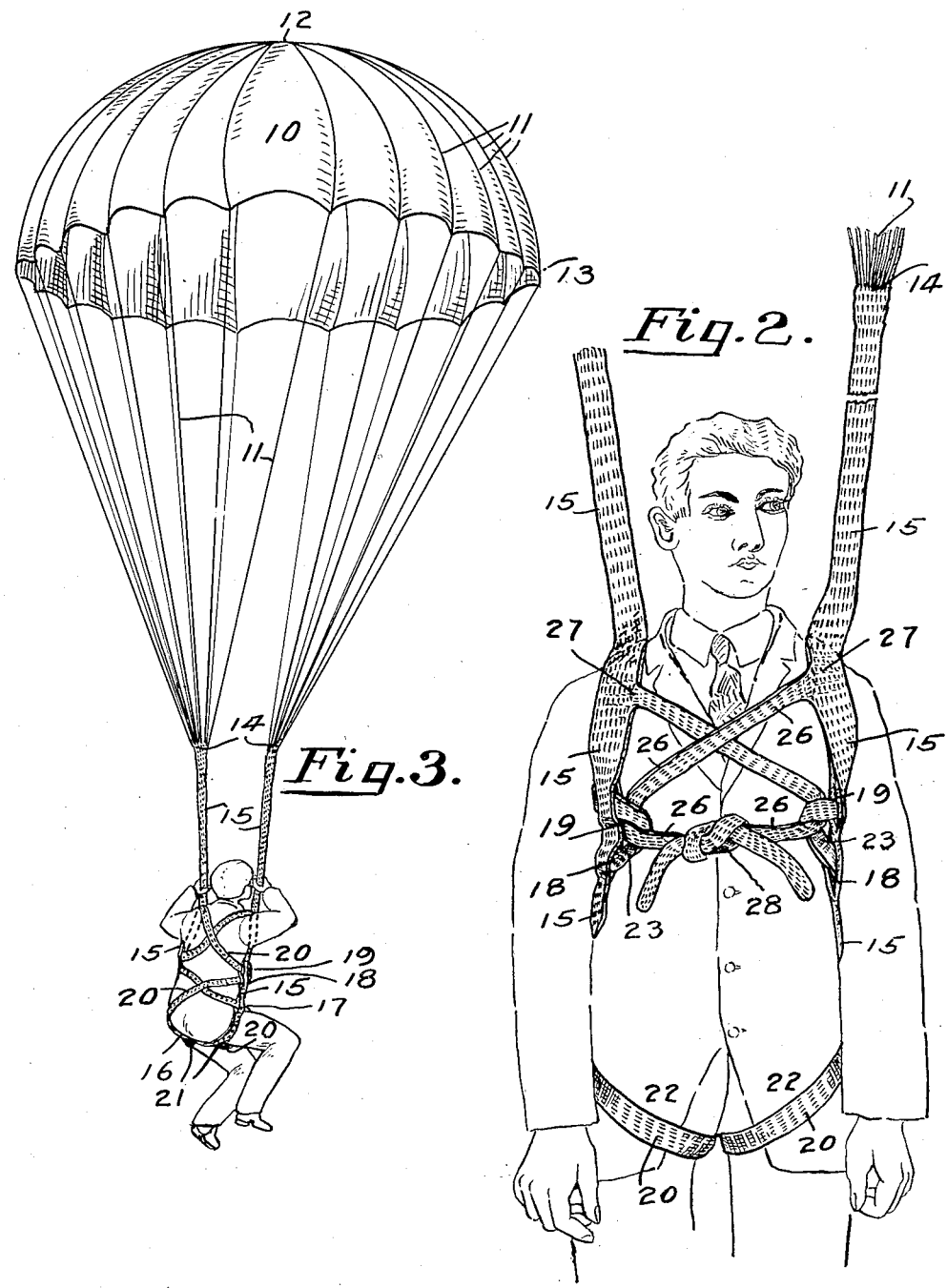

1,965,570

UNITED STATES PATENT OFFICE 1,965,570

PARACHUTE HARNESS

John A. Binnie, Philadelphia, Pa.

Application January 18, 1932, Serial No. 587,341

2 Claims. (Cl. 244—21)

(Granted under the act of March 3, 1883, as amended April 30, 1928; 370 O. G. 757)

An object of this invention is to provide a parachute harness capable of a large range of adjustment to meet the varying proportions necessary to conform to the stature of different aviators.

Another object of this invention is to provide a parachute harness of maximum strength, at a minimum weight, and one capable of comparatively small production costs.

A further object of this invention is in the provision of a parachute harness capable of being worn under the clothing of the wearer without discomfort caused by the usual buckles, hooks and button fastening devices common in use in parachute harness construction.

A further object of this invention is the provision of a parachute harness in which the main supporting member comprises a sling which is woven as a continuation of the shroud lines of a parachute, thus the continuity of the lines of force will remain unbroken since the loads will be transmitted from the apex of the parachute through the woven continuity of the main seat strap and back to the apex of the chute.

The present invention is designed for use in connection with general service parachutes whether attached to or woven as a continuation of the shroud lines of the same, and is adaptable to any of the various styles in use such as the back type, seat type, chest type, lap type or stored type where the shroud lines extend from the wearer to the pack stored a short distance away.

Reference is to be had to the accompanying drawings forming a part of this specification, in which like reference characters indicate corresponding parts throughout the several views, and in which:

Fig. 2 is a detail front view of my parachute harness as it will appear when adjusted upon the wearer Fig. 3 is a view of a parachute equipped with my parachute harness showing the arrangement of the same from the back of the wearer.

Figure 1:
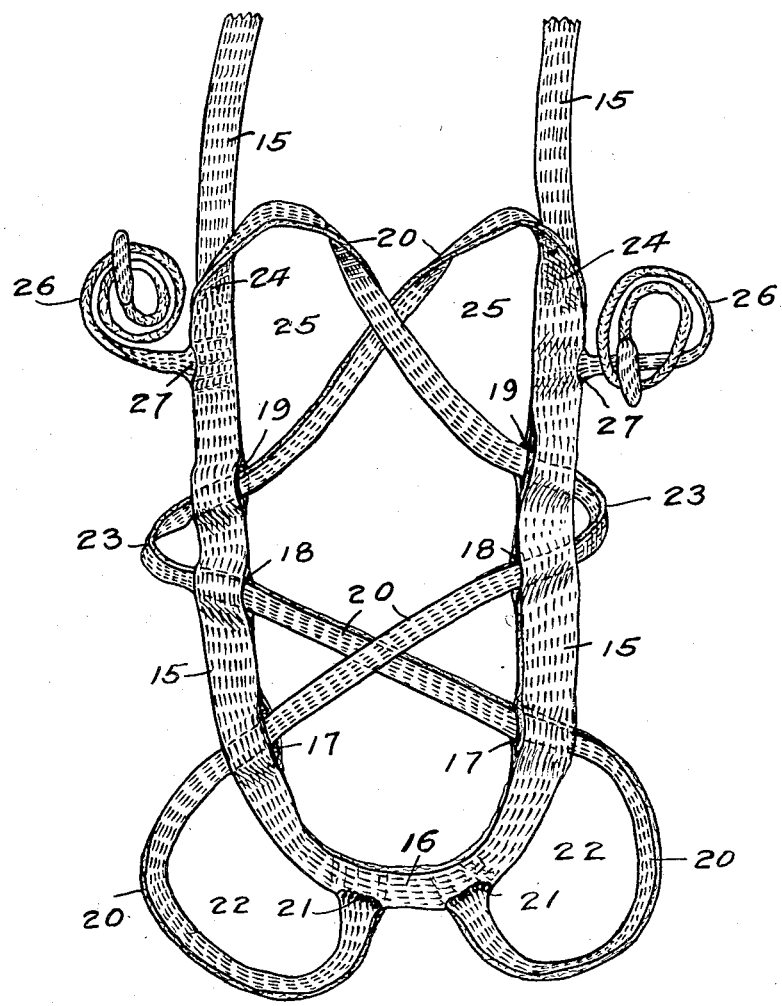
Fig. 1 is a general arrangement view of my improved parachute harness.

Referring more particularly to the drawings, 10 indicates a conventional type of parachute provided with a series of shroud lines 11 which are secured to the parachute from the apex 12 to the outer periphery 13 and extend some distance down, where they are brought together as at 14 and woven or knitted into a flat webbing to form the main support or seat sling 15 of my improved harness.

The sling 15 is of sufficient length to be extended beneath the seat of the wearer as at 16 and is woven double thickness at intervals along the vertical portions at 17, 18 and 19 to permit sliding adjustment of the straps 20 when arranged upon the wearer.

Straps 20 are also preferably formed by knitting or weaving of the same material as the shroud lines, being attached a slight distance apart at 21 so as to minimize the chance of personal injury. These straps 20 are looped to form leg holes 22 and are passed through the guides 19 to form the loops 23, and then the straps 19 are again crossed at the back of the wearer's shoulders and woven into or secured to the sling 15 at 24. The spaces 25 formed by the crossing of the straps 20 at the back provide arm holes.

Chest straps 26 are woven into or secured to the main support 15 as at 27 and are crossed in front of the wearer's chest, passed through the loops 23 formed by the straps 20 and tied preferably in a square knot 28 in front of the wearer's chest, as shown more clearly in Fig. 2.

This construction provides a design of parachute harness which is self-adjusting, self-equalizing, and due to the fact that the shroud lines of the parachute are woven into and form the main supporting structure, there is provided a continuity of line giving maximum strength, minimum weight, and one which will be capable of quick and simple production.

While I prefer to construct a parachute harness that will be light in weight and one that can be worn under the wearer's outer clothing, when desired, with ease and comfort by the elimination of belts, hooks and buckles, I reserve the right, without departing from the invention, to place suitable means between the woven straps of the harness and the shroud lines of the parachute to enable quick detachment or connection to the same in an emergency.

Means for engaging the ring attached to the rip cord of the parachute is contemplated, but since this feature, common to all parachutes, does not constitute features of the present invention, the same is not shown.

It will be understood that the above description and accompanying drawings comprehend only the general and preferred embodiment of my invention and that minor changes in the arrangement of parts may be made within the scope of the appended claims without sacrificing any of the advantages of the invention.

The invention described herein may be manufactured and used by or for the Government of the United States of America for governmental purposes without the payment of any royalties thereon.

What I claim is:

1. In a parachute, a parachute harness comprising a main suspension member terminating in a sling beneath the wearer's seat, slide openings along said main suspension member, attaching straps connected to said main suspension member near the lowest point of said main suspension member for encircling the legs of the wearer, said attaching straps being inserted through some of said slide openings to form a loop, then crossing the wearer's back above the waist line and terminating at said main suspension means above the wearer's shoulders, and straps secured to said main suspension means at the front of the wearer and in line with the collarbone of the wearer which cross the wearer's chest, pass through the loops formed in said attaching straps, and means for connecting the ends of said attaching straps.

2. In a parachute, a parachute harness comprising a main suspension member terminating in a sling beneath the wearer's seat, slide openings along said main suspension member, attaching straps connected to said main suspension member near the lowest point of said main suspension member for encircling the legs of the wearer, said attaching straps being inserted through some of said slide openings to form a loop, then crossing the wearer's back above the waist line and terminating at said main suspension means above the wearer's shoulders, and straps secured to said main suspension means at the front of the wearer and in line with the collarbone of the wearer which cross the wearer's chest, pass through the loops formed to said attaching straps, and terminating in a knot above the wearer's stomach.

JOHN A. BINNIE.